United States Patent Office 3,576,619
Patented Apr. 27, 1971

3,576,619
METHOD FOR MAKING ALLOY POWDERS
Frank Emley, Easton, Pa., assignor to
Pfizer Inc., New York, N.Y.
No Drawing. Filed Mar. 21, 1969, Ser. No. 809,417
Int. Cl. B22f 9/00
U.S. Cl. 75—.5                    7 Claims

ABSTRACT OF THE DISCLOSURE

Composite powders suitable for powder metallurgy are prepared by reducing an oxide of copper or silver blended with elemental tungsten or molybdenum powder.

BACKGROUND OF THE INVENTION

Copper-tungsten composites are employed in a variety of industrial applications. Such products have been prepared in the past by subjecting blends of the elemental powders to conventional powder metallurgy techniques, but this approach suffers from a number of disadvantages. Powder blends are subject to segregation before use, to blistering during sintering, and also to poor molded green strength. The familiar infiltration technique provides better results but at a substantial sacrifice in economy and simplicity of operation. Accordingly, it has been recommended that oxides of copper and tungsten be co-reduced to provide a composite powder suitable for conventional powder metallurgy. Powders produced in this manner, however, are found to exhibit inferior green strength and flow properties. Products in which molybdenum is substituted for tungsten, and those in which silver is substituted for copper, behave similarly. Molybdenum is often substituted for tungsten where light weight is required, and silver is frequently preferred over copper where the product is employed in an electrical contact.

SUMMARY OF THE INVENTION

It has now been discovered that composite copper-tungsten powders of superior properties are obtained by reducing a blend of finely divided copper oxide and elemental tungsten powder. For most applications, a copper content of about 5–75% by weight, and especially about 20–50% by weight, is preferred. Reduction can be effected at temperatures between about 1000 and 2000° F. Comparable results are obtained when copper oxide is replaced by silver oxide and/or when tungsten is replaced by molybdenum.

DETAILED DESCRIPTION OF THE INVENTION

The invention embraces the preparation of composite powders containing tungsten and/or molybdenum in combination with 5–75% copper and/or silver. It includes, for example, the preparation of tungsten-copper; molybdenum-copper; tungsten-silver; molybdenum-silver; and tungsten-molybdenum-copper powders, etc.

Among the copper oxides suitable for the new process, cupric oxide is satisfactory but cuprous oxide provides superior results. It is by no means necessary to employ a pure oxide of copper, and such industrial products as copper flue dust and cement copper are eminently suitable. These products often contain both cuprous and cupric oxides, as well as substantial proportions of elemental copper. Cement copper is rich in cuprous oxide and preferred. Best results are obtained with products containing up to about 50% cuprous oxide, up to about 8% cupric oxide and up to about 75% elemental copper. The expression "copper oxide" as employed herein and in the appended claims is intended to embrace such products as well as the purer but more expensive forms of copper oxides. In determining the relative proportions of a given copper oxide required to achieve a desired copper-tungsten ratio, one will, of course, base the computation on the total copper content of the source, including copper present in the elemental form as well as that present in the form of cuprous and cupric oxides.

Any elemental tungsten powder can be employed in the new process, but a hydrogen-reduced grade, finer than 325 mesh, is ordinarily preferred. Powders having a particle size of about 2–10 microns give excellent results.

The copper oxide and/or silver oxide and tungsten and/or molybdenum are first intimately blended in calculated proportions, either in the dry state or in the form of an aqueous slurry. Effective blending can be achieved in a ball mill, a mix Muller, or similar equipment. In the case of wet blending the blended slurry is then dried and may be powdered, if desired. Dry blending is, however, preferred for simplicity of operation.

The blend can be reduced in a reducing atmosphere, e.g. a hydrogen- or carbon-monoxide-containing atmosphere. Dissociated ammonia gives results substantially equivalent to those obtained with pure hydrogen, and at a saving in cost. Alternatively, reduction can be achieved by incorporating a small proportion of carbon in the blend, e.g. in the form of finely divided petroleum coke. The carbon content should correspond to at least the stoichiometric proportion demanded by the reaction, but optimum levels are best determined by experiment. Carbon concentration of about 1–3% are typical.

The new process is effective over a surprisingly wide range of reduction temperatures, e.g. from about 1000 to 2000° F. Optimum reduction temperatures vary with the composition, but best results with copper oxides are usually obtained between about 1750 and 1925° F.; temperatures below 1750° F. are preferred with silver oxide. Excessively low reduction temperatures tend to produce products of very fine particle size which exhibit less than optimum flow properties. While this may be a disadvantage in automatic pressing applications, it will be of no importance in products destined for such applications as isostatic pressing, roll compacting, etc. At the same time, relatively low reduction temperatures have the advantage of minimizing sintering during reduction, and they therefore avoid the need for grinding the final product. On the other hand, relatively high reduction temperatures tend to produce products of relatively large particle size and to encourage sintering during reduction. In this case, the reduced product usually requires crushing and milling before it is ready for use.

The time required for reduction varies with the composition and conditions, and is therefore best determined by expriment. In most cases, a reduction time of about 45 minutes to an hour is ample, and appreciably less time is often adequate. If the final product is sintered to a spongy cake, it can now be crushed in a jaw crusher and ground in a hammer mill to the desired particle size, e.g. through a 100 mesh screen.

The resulting powders give superior results in powder metallurgy application wherever good green strength is required for compaction to practical geometry. They are especially suitable for the molding of electrodes for use in electron discharge machining (EDM). As is well known, EDM represents a method for producing a cavity in electrically conductive stock, as in die manufacture. Controlled removal of material is achieved through melting or vaporization by high frequency electrical spark discharge. The method employs controlled pulsing of direct current between the work piece, usually positively charged, and the tool or electrode, usually negatively charged. Copper-tungsten alloys find use as electrodes in this application for their good resistance to edge breakdown and the ready production of smooth surfaces which they facilitate. The products of the present invention are superior to both premixes and infiltrated products, since a more uniform, fine dispersion, free of relatively large areas or "lakes" of copper, is obtained, affording lower and more uniform wear rate.

The products of the new process, upon pressing, yield substantially greater green strength than is obtainable from elemental powder blends or from co-reduced oxides of the corresponding metals. It has been observed in the case of copper-tungsten that such co-reduced products usually take the form of copper particles coated with tungsten, whereas the products of the present invention are ordinarily in the form of the tungsten particles coated wtih copper. The invention likewise provides tungsten particles coated with silver, and molybdenum particles coated with copper. The significance of this phenomenon has not yet been fully explored.

The superior green strength provided by this invention is realized even upon pressing to relatively low densities, and the resulting products exhibit better machining properties than do infiltrated products.

The powders produced by the new process exhibit high apparent density and good flow properties, particularly in the copper-containing products at copper contents of 20% and higher, and at reduction temperatures of about 1750° F. and higher. These are therefore preferred in applications which require filling a die in an automatic press. Such advantages have not been observed with co-reduced powders prepared from tungsten oxides.

The following examples are provided for illustrative purposes and are not intended to restrict the invention, the scope of which is defined by the appended claims. The flow properties reported herein are those obtained with a Hall flow meter provided with a 0.040 inch orifice. It should therefore be understood that when a no flow condition is reported, this observation will not necessarily hold for another size of orifice.

A compacting pressure of 20 tons per square inch (t.s.i.) is employed in the examples for molding the powders of the present invention before physical test. This pressure is selected to emphasize individual shortcomings and distinctions between products. Higher pressures can, of course, also be employed, e.g. 30–60 t.s.i., and the products of the present invention continue to afford substantial advantages. Sintering of the molded products can be carried out under conventional conditions, typically at about 2050° F. for about a half hour.

Example 1

Cement copper containing about 75% total solids is pre-dried at 210–300° F. for 3–4 hours and milled in a hammer mill to a powder finer than 100 mesh. This product is combined with sufficient tungsten powder finer than 325 mesh to provide a composition containing the equivalent of 25% by weight of copper after reduction. The mixture is blended for one hour in a ball mill containing quarter-inch diameter stainless steel balls equivalent to about one-third of the mill volume, and the milled blend is then loaded into stainless steel trays to a depth of three-quarters of an inch. The composition is then reduced by heating at 1825° F. for 45–60 minutes in dissociated ammonia. The resulting spongy cake is cooled, crushed, and ground to finer than 100 mesh in a hammer mill.

The resulting powder exhibits the following properties:

Apparent density (ASTM B 212–48)—4.6 g./cc.
Average particle size (ASTM B 330–65)—10–15µ
Maximum flow time (ASTM B 213–48)—22 sec./50 g.
Green density (ASTM B 331–64) [1]—10.0 g./cc.
Green strength (ASTM B 312–64) [1]—2800 p.s.i.

[1] Average values for three 15-g. bars pressed at 20 p.s.i.

Example 2

The procedure of Example 1 is repeated, this time milling the cement copper-tungsten mixture in the form of an aqueous slurry and then drying and crushing before reduction, with substantially the same results.

Example 3

The procedure of Example 1 is repeated, substituting an equivalent proportion of copper flue dust for the cement copper and reducing at 1700° F. instead of 1825° F. The product powder exhibits the following properties:

Apparent density—4.4 g./cc.
Average particle size—10–15µ
Maximum flow time—22 sec./50 g.
Green density—10.0 g./cc.
Green strength—2500 p.s.i.

Example 4

The procedure of Example 1 is repeated, this time incorporating 1.5 weight percent carbon (Cabot coke) in the tungsten-cement copper blend, and conducting the reduction in a nitrogen atmosphere. The final powder is found to contain 0.52% carbon and 0.18% oxygen. It closely resembles the product of Example 1 in all properties except green strength (1400 p.s.i.).

Examples 5–9

The procedure of Example 1 is repeated at various copper levels, with results as recorded below:

| Example | Reduction temperature, °F. | Percent copper | Apparent density, g./cc. | Particle size, µ | Maximum flow time, sec. | Green density | Green strength, p.s.i. |
| --- | --- | --- | --- | --- | --- | --- | --- |
| 5 | 2,000 | 5 | 4.95 | 12.5 | (1) | 11.52 | 490 |
| 6 | 1,800 | 10 | 4.92 | 10.0 | (1) | 10.55 | 1,520 |
| 7 | 1,800 | 35 | 4.37 | 11.6 | 20 | 9.68 | 4,100 |
| 8 | 1,800 | 50 | 3.78 | 8.4 | 20 | 8.74 | 3,930 |
| 9 | 1,800 | 75 | 2.75 | 8.2 | 24 | 7.66 | 4,080 |

[1] No flow.

Examples 10–20

The procedure of Example 1 is repeated at a copper level of 25%, employing various reduction temperatures, with results as recorded below:

| Example | Reduction temperature, °F. | Apparent density, g./cc. | Particle size, µ | Maximum time flow, sec. | Green density | Green strength, p.s.i. |
| --- | --- | --- | --- | --- | --- | --- |
| 10 | 1,000 | 4.17 | 4.4 | (1) | 10.47 | 1,480 |
| 11 | 1,100 | 4.42 | 4.2 | (1) | 10.72 | 1,680 |
| 12 | 1,200 | 4.16 | 5.0 | (1) | 10.62 | 2,170 |
| 13 | 1,400 | 4.19 | 6.0 | (1) | 10.44 | 2,920 |
| 14 | 1,500 | 4.88 | 6.4 | (1) | 10.55 | 2,700 |
| 15 | 1,600 | 4.68 | 7.4 | (1) | 10.37 | 3,190 |
| 16 | 1,875 | 4.8 | 15 | 22 | 10.3 | 2,800 |
| 17 | 1,900 | 5.02 | 19 | 14.5 | 10.48 | 2,600 |
| 18 | 1,950 | 6.04 | 27 | 12 | 10.56 | 1,500 |
| 19 | 2,000 | 5.49 | 16 | 13.5 | 10.08 | 1,840 |
| 20 | 2,100 | 6.67 | 30 | 12 | 10.22 | 700 |

Example 21

The procedure of Example 1 is repeated, substituting molybdenum for tungsten, with reduction in hydrogen at 1800° F. The product exhibits an average particle size of 6 microns and, upon molding at 20 t.s.i., a green density of 6.67 g./cc. and a green strength of 2600 p.s.i.

Example 22

Silver oxide ($Ag_2O$) is blended dry in a ball mill for an hour with sufficient tungsten powder to provide a product containing 25% silver after reduction. The blend is reduced at 1700° F. in dissociated ammonia for one hour to obtain a powder having an apparent density of 5.11 g./cc. and a maximum flow time of 15.5 seconds. Upon molding at 20 t.s.i. it has a green density of 11.25 g./cc. and a green strength of 2800 p.s.i.

When the same silver oxide is reduced separately and the resulting silver powder blended with 3 parts by weight of tungsten powder and pressed at 20 t.s.i., the molding has a green density of 11.46 g./cc. but a green strength of only 420 p.s.i.

For comparison with the foregoing examples, the procedure of Example 1 is repeated, this time employing an equivalent proportion of tungstic acid in place of elemental tungsten and at a copper level of 25%, with results as follows:

| Reduction temperature °F. | Apparent density, g./cc. | Particle size, μ | Maximum Flow Time | Green Density | Green Strength, p.s.i. |
|---|---|---|---|---|---|
| 1,700 | 3.3 | 4.1 | No flow | 9.67 | 340 |
| 1,800 | 2.8 | 4.7 | No flow | 9.72 | 190 |

For further comparison, the procedure of Example 1 is again repeated, this time employing an equivalent proportion of tungsten oxide $W_5O_{11}$ in place of elemental tungsten and at a copper level of 25%, with results as follows:

| Reduction temperature °F. | Apparent density, g./cc. | Particle size, μ | Maximum Flow Time | Green Density | Green Strength, p.s.i. |
|---|---|---|---|---|---|
| 1,700 | 1.84 | 3.30 | No flow | 9.41 | 470 |
| 1,800 | 1.90 | 4.20 | No flow | 9.56 | 775 |
| 1,850 | 1.83 | 3.00 | No flow | 9.40 | 605 |
| 1,900 | 1.91 | 3.40 | No flow | 9.56 | 765 |

What is claimed is:

1. A process for the preparation of composite tungsten or molybdenum powder containing from about 5 to 75 weight percent of copper or silver which comprises intimately blending finely divided elemental tungsten or molybdenum with finely divided oxide of copper or silver and exposing said blend to a temperature of from about 1000 to 2000° F. under reducing conditions until said oxide is substantially completely reduced.

2. The process of claim 1 wherein said oxide is copper oxide and said temperature is between about 1750 and 1925° F.

3. The process of claim 1 wherein said oxide is silver oxide and said temperature is below 1750° F.

4. The process of claim 1 wherein said copper content is between about 20 and 50 weight percent.

5. The process of claim 1 wherein said copper oxide is flue dust.

6. The process of claim 1 wherein said copper oxide is rich in cuprous oxide.

7. The process of claim 6 wherein said copper oxide is cement copper.

References Cited

UNITED STATES PATENTS

| | | | |
|---|---|---|---|
| 1,733,752 | 10/1929 | Ramage | 75—0.5 |
| 2,410,717 | 11/1946 | Cox | 75—176 |
| 2,983,996 | 5/1961 | Neely et al. | 75—176 |
| 3,045,331 | 7/1962 | Ang et al. | |

L. DEWAYNE RUTLEDGE, Primary Examiner

W. W. STALLARD, Assistant Examiner

U.S. Cl. X.R.

75—211